United States Patent [19]

Schaeffler et al.

[11] 3,876,267

[45] Apr. 8, 1975

[54] AXIAL CAGE FOR CYLINDRICAL ROLLERS

[75] Inventors: Georg Schaeffler; Gerhard Hornschuh; Rudolf Jahn; Jurgen Rabe; Arpad Toth, all of Herzogenaurach, Germany

[73] Assignee: Industriewerk Schaeffler OHG, Herzogenaurach, Germany

[22] Filed: Aug. 10, 1973

[21] Appl. No.: 387,476

[30] Foreign Application Priority Data
Aug. 29, 1972 Germany.......................... 2242432
June 22, 1973 Germany.......................... 2331787

[52] U.S. Cl. .............................................. 308/235
[51] Int. Cl. ............................................ F16c 33/58
[58] Field of Search.................... 308/217, 218, 235

[56] References Cited
UNITED STATES PATENTS
3,644,007   2/1972   Alling................................. 308/235
3,785,710   1/1974   Alling................................. 308/235

FOREIGN PATENTS OR APPLICATIONS
1,277,275   10/1961   France............................... 308/235

Primary Examiner—M. Henson Wood, Jr.
Assistant Examiner—Richard A. Bertsch
Attorney, Agent, or Firm—Hammond & Littell

[57] ABSTRACT

An axial cage for cylindrical rollers comprising 2 annular rims arranged concentric one in the other and connected by wedge-shaped cross bars uniformly distributed over the circumference thereof, said cross bars forming radially extending pockets for accommodating cylindrical rollers, the said pockets arranged close enough so that there is mutual contact between adjacent pockets in their radially innermost area and the said cross bars being provided with cutouts to provide for connection between adjacent pockets and an injection-molding apparatus for producing said cages.

3 Claims, 5 Drawing Figures

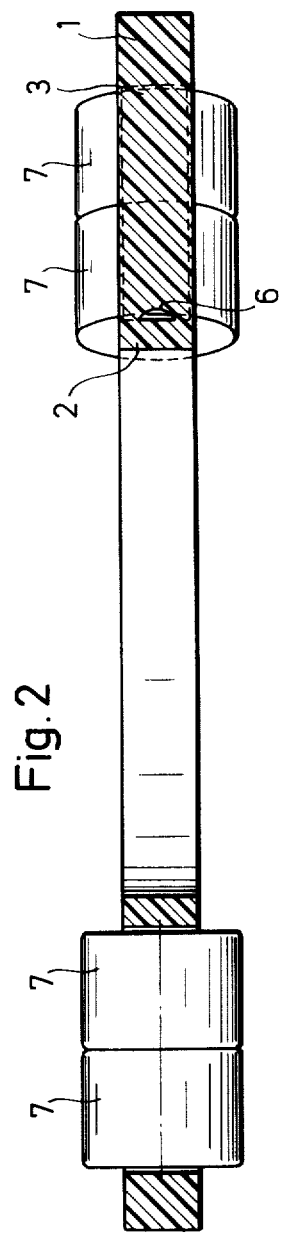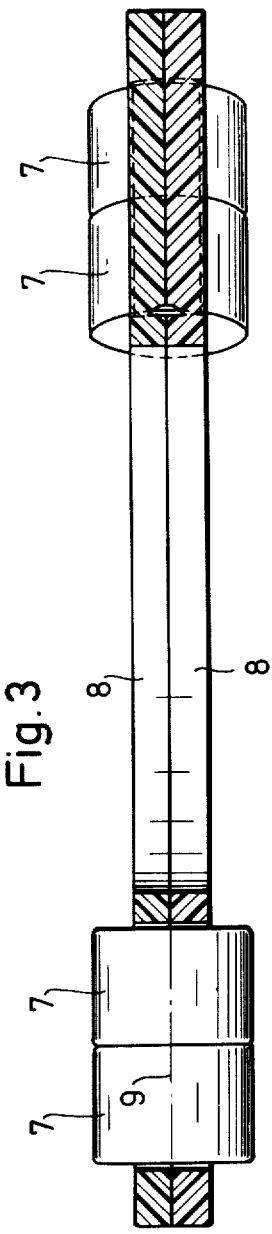

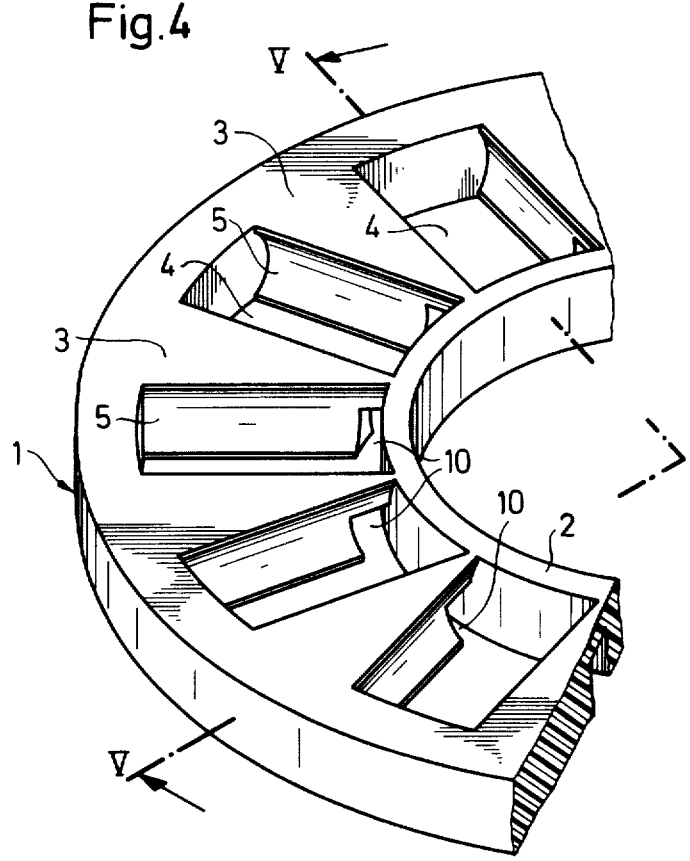

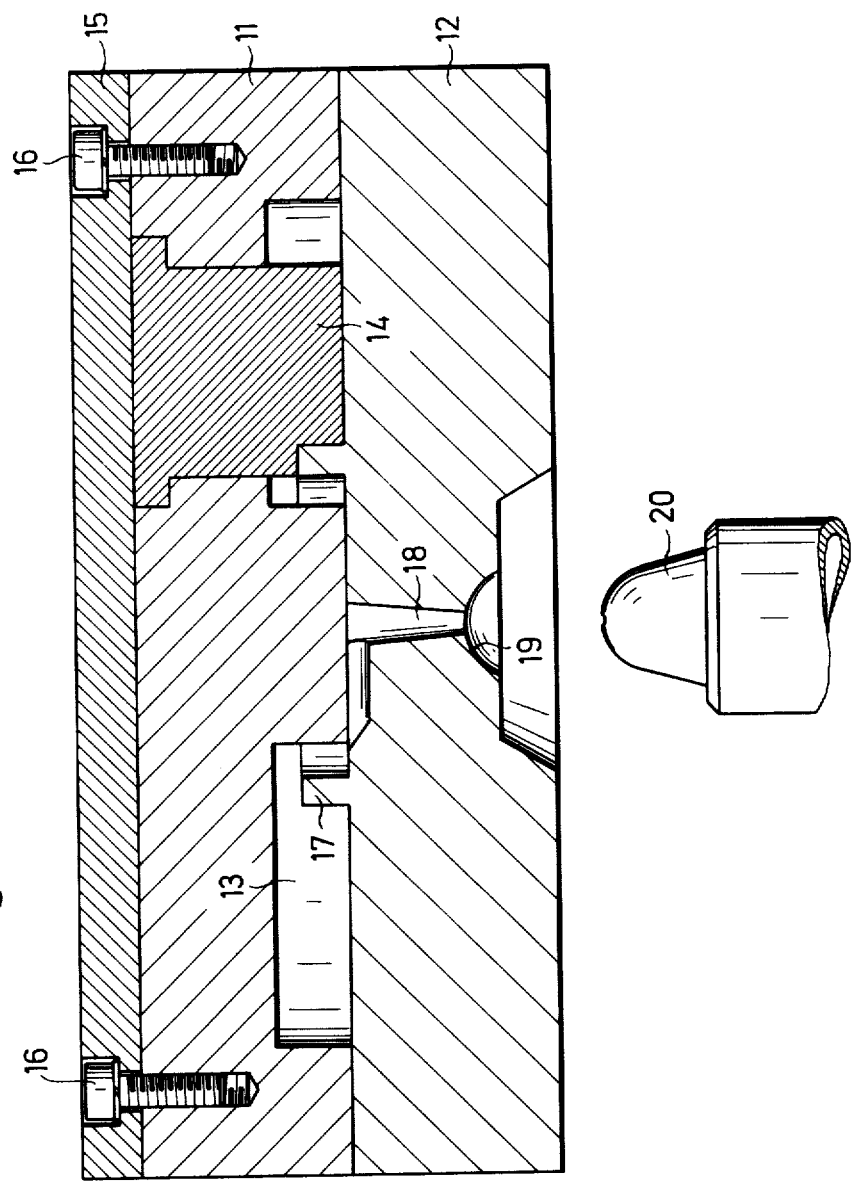

AXIAL CAGE FOR CYLINDRICAL ROLLERS

STATE OF THE ART

Axial cages to accommodate cylindrical rollers are known and these cages have been designed in various ways to try to accommodate a maximum number of rollers therein to increase the load capacity of said cages. In known cages of this type, these attempts have been limited by the fact that the distance between the pockets would be only so little as the cross bars defining the pockets required in their radially innermost region sufficient material cross section to insure a reliable connection with inner annular rim.

One proposed design of this type of axial cage is the comb-type cage in which the cross bars forming the roller pockets extend radially inward from a single outer annular rim. The use of such freely projecting cage cross bars allows the roller pockets to be brought close enough together to permit mutual contact between the rollers in their radially innermost section so that a maximum number of rollers may be accommodated. However, this advantage is obtained at the expense of a sufficiently stiff cage which can lead to intolerable deformations in some cases so the use of such cages is limited.

OBJECTS OF THE INVENTION

It is an object of the invention to provide a novel axial cage for rollers which will accommodate as many rollers as the comb cages without the disadvantages thereof.

It is a further object of the invention to provide a novel apparatus for the production of axial cages.

These and other objects and advantages of the invention will become obvious from the following detailed description.

THE INVENTION

The novel axial cage of the invention is comprised of two annular rims arranged concentric one in the other and connected by wedge-shaped cross bars uniformly distributed over the circumference thereof, said cross bars forming radially extending pockets for accommodating cylindrical rollers, the said pockets arranged close enough so that there is mutual contact between adjacent pockets in their radially innermost area and the said cross bars being provided with cutouts to provide for connection between adjacent pockets.

This construction makes it possible, as in comb cages, to bring the rollers close enough together circumferentially so that they are in mutual contact in their radially innermost region. This minimum distance between adjacent rollers exists in the area of cut outs located in the center of the cage cross bars thereby connecting the pockets. In the regions of the cage cross bars contiguous to the cutouts on both sides toward the end faces of the cage, the crossbars are left with a sufficiently large cross-section at which the crossbars are connected with the inner annular rim. This structural design thus achieves that the rollers can be moved next to each other except for the minimum mutual distance — in the extreme case, in fact, up to mutual contact — without giving up the advantage of connecting the cage crossbars at their radially innermost ends with an annular rim to obtain a cage of high stiffness.

The manufacture of such a cage can occur in various ways. One mode of manufacture is that the cage consists of two identical halves, which border on each other in the radial plane extending through the roller axes. With such a design it is possible to effect in the simplest manner the forming of the pocket-defining crossbar surfaces together with the cutouts in the region of the radially inner web ends, and this independently of whether these cage halves are manufactured by chip-removing operations or whether they are manufactured by pressing, forging, injection molding or the like. When producing the cage from two halves, it is particularly appropriate to manufacture these in a manner known in itself by injection molding from plastic and then to connect the two halves together by ultrasonic welding.

However, it is also within the scope of the invention to manufacture such a cage in one piece from plastic. This can be achieved in that the cutouts extend in the region of the crossbar ends, starting from one end face of the cage, to beyond one-half of the axial thickness of the crossbars. Due to the fact that in this variant the cutouts extend on one side up to the end face of the cage, i.e. are open toward the outside, it is possible to form such cutouts by a simple injection molding tool which permits simple stripping of the cage from the mold.

A simple apparatus for the manufacture of such a cage may be designed so that it forms a two-part injection mold divisible in a plane extending crosswise to the cage axis, one mold half being provided in the region of the radially inner ends of the crossbars with projections which extend beyond one-half of the axial thickness of the crossbars.

Referring now to the drawings:

FIGS. 2 and 3 are cross-sections of the cage taken along the line II/III — II/III of FIG. 1.

FIG. 4 is a partial perspective view of another embodiment of the axial cage of the invention.

FIG. 5 is a cross-sectional view through an injection mold along the line of V—V of FIG. 4 for the production of a cage of FIG. 4.

Figure 1:
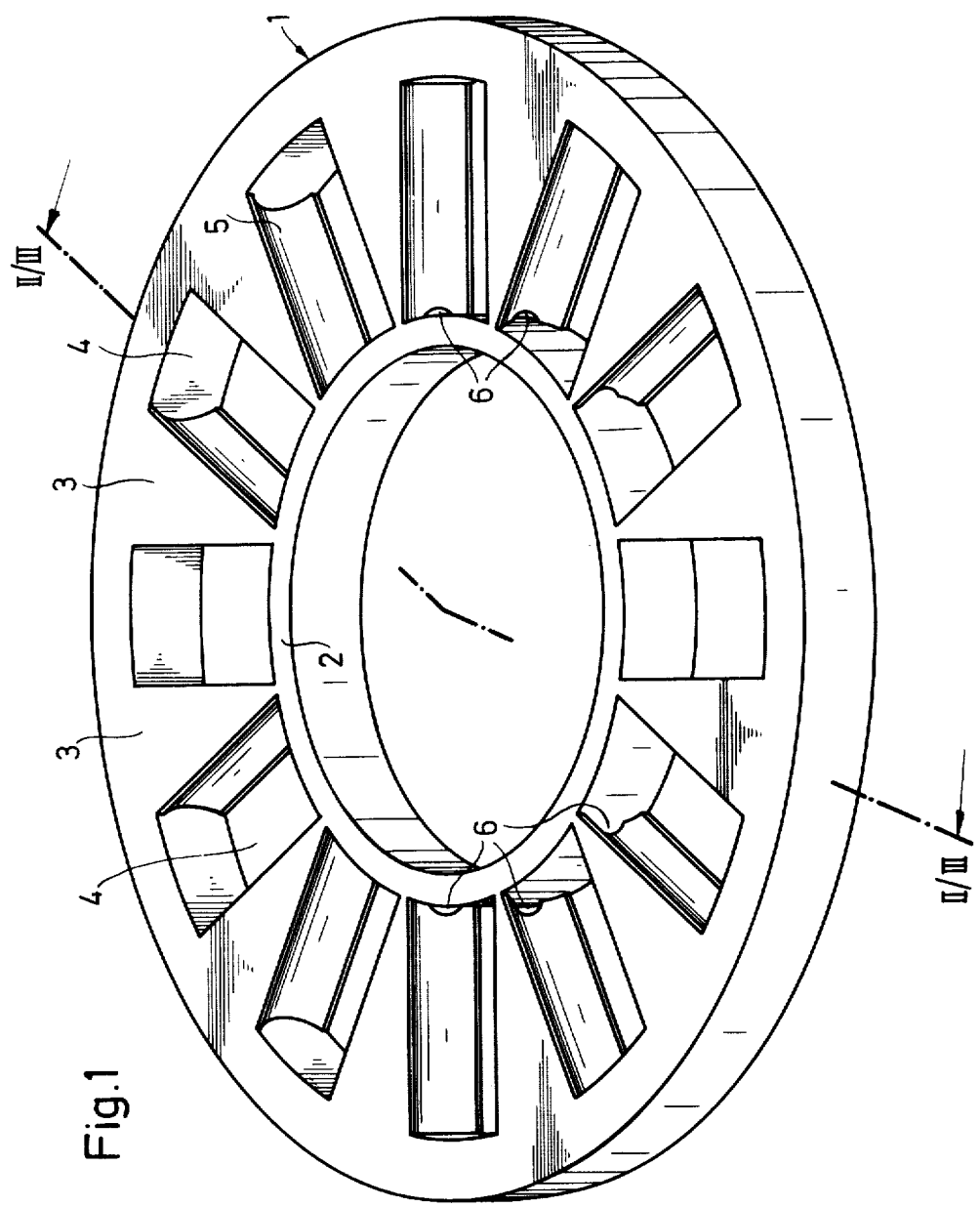
FIG. 1 is a perspective view of one embodiment of the axial cage of the invention.

In FIG. 1, the axial cage consists of outer annular rim 1, inner annular rim 2, and the wedge-shaped crossbars 3 connecting the two annular rims. The crossbars 3 are uniformly distributed over the circumference of the cage and define pockets 4 serving which accommodate cylindrical rollers (not shown). The lateral delimiting walls 5 of the pockets 4 are designed in the shape of partial cylinder surfaces adjusted to the outer contour of the cylindrical rollers. In their radially innermost regions, the crossbars 3 have, in their center, cutouts 6 connecting adjacent pockets 4. In the region of these cutouts 6, the rollers introduced in the pockets can come into mutual contact in the extreme case.

FIG. 2, which represents a section along line II/III — II/III of FIG. 1, indicates on the right side again distinctly the cutout 6 in the radially innermost region of the cage crossbars. For greater clarity, there are entered in this as well as in FIG. 3 two cylinder rollers 7 in each pocket 4.

FIG. 3 differs from FIG. 2 only in that the cage consists of two identical halves 8, which are contiguous to each other in the radial plane extending through the roller axes 9 and are interconnected in suitable manner.

The cage, shown in FIG. 4 differs from that of FIG. 1 in that the cutouts 10 in the region of the crossbar ends are open toward the end face of the cage at the bottom and extend upwardly to beyond one-half of the thickness of the crossbar 3.

FIG. 5 shows an injection mold which is suitable for the manufacture of the cage of FIG. 4 and consists of upper mold half 11 and lower mold half 12. The upper mold half 11 has the circular, ring-shaped cutout 13, into which protrude the dies 14 inserted at regular intervals, which dies shape the pockets 4 of the cage. These dies 14 are inserted from the top side of the upper mold half 11 and are held therein by cover plate 15 which is connected with the upper mold half 11 by screws 16. The lower mold half 12 is provided with an annular collar 17 protruding into the circular ring-shaped cutout 13, which collar extends to beyond one-half the height of the cutout 13. In the center, the lower mold half 12 is provided with sprue 18, which terminates in seat 19 for nozzle 20.

When thermoplastic material is injected into the mold through nozzle 20, which for this purpose is moved against seat 19 so that all remaining cavities are filled by it, a cage is formed in which cutouts 10 shown in FIG. 1 are formed by the annular collar 17. After completion of the injection process, the upper mold half 11 and lower mold half 12 are moved apart whereupon the cage can be removed from the injection mold by suitable ejectors not shown.

Various modifications of the cage and apparatus of the invention may be made without departing from the spirit or scope thereof and it is to be understood that the invention is to be limited only as defined in the appended claims.

We claim:

1. An axial cage for cylindrical rollers comprising two plastic annular rims arranged concentric one in the other and connected by wedge-shaped crossbars uniformly distributed over the circumference thereof, said crossbars having a surface adapted to the shape of the rollers thereby forming radially extending pockets for accommodating cylindrical rollers, the said pockets arranged close enough so that there is mutual contact between adjacent pockets in their radially innermost area and the said crossbars being provided in their radially innermost area, with cutouts to provide for connection between adjacent pockets and for contact between the rollers therein.

2. An axial cage of claim 1 consisting of two identical halves which are contiguous to each other in the radial plane extending through the roller axes.

3. An axial cage of claim 1 wherein the cutouts extend from one end face to the cage to beyond one-half of the axial thickness of the crossbar.

* * * * *